United States Patent [19]

Terano et al.

[11] Patent Number: 4,686,200

[45] Date of Patent: Aug. 11, 1987

[54] CATALYST FOR THE POLYMERIZATION OF OLEFINS

[75] Inventors: Minoru Terano; Hirokazu Soga; Masuo Inoue; Katsuyoshi Miyoshi, all of Kanagawa, Japan

[73] Assignee: Toho Titanium Co., Ltd., Japan

[21] Appl. No.: 932,047

[22] Filed: Nov. 18, 1986

[30] Foreign Application Priority Data

Nov. 26, 1985 [JP] Japan ............................. 60-263863
Dec. 25, 1985 [JP] Japan ............................. 60-290838
Jan. 22, 1986 [JP] Japan ............................. 61-10250

[51] Int. Cl.$^4$ ............................................. C08F 4/64
[52] U.S. Cl. ................................. 502/112; 502/105; 502/115; 502/123; 502/127; 526/125
[58] Field of Search ............... 502/105, 112, 115, 123, 502/127

[56] References Cited

U.S. PATENT DOCUMENTS

| | | | |
|---|---|---|---|
| 4,242,231 | 12/1980 | Ueno et al. | 502/105 X |
| 4,246,384 | 1/1981 | Selman | 502/105 X |
| 4,282,114 | 8/1981 | Ito et al. | 502/105 |
| 4,310,439 | 1/1982 | Langer | 502/123 |
| 4,339,560 | 7/1982 | Baba et al. | 502/115 X |
| 4,402,863 | 9/1983 | Miyazaki et al. | 502/115 X |
| 4,414,132 | 11/1983 | Goodall et al. | 502/123 X |
| 4,640,906 | 2/1987 | Terano et al. | 502/123 X |

*Primary Examiner*—Patrick P. Garvin
*Attorney, Agent, or Firm*—Birch, Stewart, Kolasch & Birch

[57] ABSTRACT

A catalyst for the polymerization of olefins which comprises:

(A) a solid catalyst component prepared by bringing a co-ground product of a substance (a) obtained by reacting magnesium with at least two molar proportion of an alkyl monohalide in the absence of a solvent but in the presence of iodine and a dialkyl phthalate (b) and optionally existing titanium tetrachloride (c) into contact with titanium tetrachloride in the presence or absence of an aromatic hydrocarbon and/or halohydrocarbon.

(B) a 2,6-dialkyl- or 2,2,6,6-tetraalkyl-piperidine derivative, and (C) an organoaluminum compound selected from a trialkyl aluminum, a dialkylaluminum halide and an alkylaluminum dihalide, as well as the solid catalyst component (A) for the catalyst. This catalyst characterized by the use of the specific solid catalyst component exhibits a high polymerization activity combined with stereospecific performance over a prolonged polymerization time and is free from any problem of corrosion and odor in the resultant polymer.

67 Claims, No Drawings

CATALYST FOR THE POLYMERIZATION OF OLEFINS

BACKGROUND OF THE INVENTION

1. Field of the Invention

The present invention relates to a new catalyst for the polymerization of olefins which exhibits a high catalytic activity and is capable of producing a highly stereospecific olefin polymer and to a specific solid catalyst component used for the catalyst. More particularly, the present invention relates to a new catalyst for the polymerization of olefins which is useful for producing highly stereoregular olefin polymers in a high yield and maintains its catalytic activity and stereospecific performance for a prolonged period of time and which comprises a specific solid catalyst component, a disubstituted or tetrasubstituted piperidine derivative and an organoaluminum compound, as well as the specific solid catalyst component for the catalyst, which can be prepared from magnesium, an alkyl monohalide, a phthalic diester and titanium tetrachloride according to a series of specific treatments.

2. Description of the Prior Art

In recent years, a number of new type catalysts for the polymerization of olefins including propylene were developed and proposed, wherein a titanium active ingredient supported together with an electron donor on magnesium chloride is used, in place of the conventionally known titanium trichloride catalyst component.

Among these new type catalysts, those developed at the earliest stage were comprised of a product obtained by copulverizing a complex of titanium tetrachloride and an organic monocarboxylic acid ester as an electron donor with magnesium chloride or of a product obtained by treating a copulverized product of magnesium chloride and an organic monocarboxylic acid ester as an electron donor with titanium tetrachloride (Japanese Laid-open Patent Appln. No. Sho. 50-126590).

However, these catalysts cannot be said to possess characteristics satisfactory for the use in an industrial scale. In order to improve various characteristics of the catalysts, a number of improvements have been proposed hitherto, for example, including the use of diethoxymagnesium, the use of a specific compound as an electron donor and modifications made for a method for combining the above ingredients or a contact means between the ingredients. In Japanese Laid-open Patent Appln. No. Sho. 59-12904, for example, there is disclosed a catalyst component for such catalysts which is derived from a magnesium compound of the formula: $Mg(OR)_2$ where R is an alkyl, cycloalkyl or aryl group, an aromatic monocarboxylic ester and a titanium compound of the formula: $TiX_4$ where X is a halogen atom. In Japanese Laid-open Patent Appln. No. Sho. 54-94590, for example, there is disclosed a modified process wherein a catalyst component is prepared by bringing a magnesium dihalide treated with an electron donor into contact with a tetravalent titanium compound having at least one halogen atom optionally with an electron donor, and the resultant catalyst component is then combined with an organoaluminum compound, an ester of an aromatic monocarboxylic acid and a compound of the formula: M—O—R (wherein M is a metal belonging to the Groups I-A, II-A, II-B, III-A, III-B, IV-A and IV-B of the Periodic Table and R is hydrogen or a hydrocarbyl group) to prepare a catalyst for the polymerization of olefins which is improved to have resistance to deactivation. In Japanese Laid-open Patent Appln. No. Sho. 57-63310, there is disclosed a process for the polymerization of propylene with the aid of an improved catalyst which is derived from a catalyst component comprised of various esters as an electron donor, magnesium chloride in an activated form and a titanium compound; a compound containing a Si—O or Si—N linkage and an organo-aluminum compound. These catalysts are slightly improved in catalytic performance but do not reach a practically satisfactory level in catalytic performance and quality of the resultant polymer.

However, the improved processes recently proposed have also such drawbacks that chlorine contained in the magnesium chloride predominantly used as the carrier in the prior arts as well as a halogen atom contained in the titanium halide give bad influence on the resultant polymer. In these processes is required, therefore, high catalytic activity which is indeed high enough to make the influence of chlorine substantially negligible or reduction in the amount of magnesium chloride contained in the catalyst component.

In the polymerization of olefins in an industrial scale, especially in the production of stereoregular polymers in a commercial scale from propylene, butene-1 or the like olefin, it is usually indispensable to use an electron donor such as an ester of an aromatic monocarboxylic acid for a catalyst containing magnesium chloride as a carrier and in combination with an organoaluminum compound. In this case, it is necessary to use an ester of an organic monocarboxylic acid in an extremely large amount in the polymerization process, thus resulting in such a new problem that the ester imparts its peculiar esteric odor to the resultant polymer. What is more, a serious problem arises in the use of such catalyst. In the so-called supported catalyst having high catalytic activity, such as a catalyst containing magnesium chloride as a support, the activity of the catalyst at the initial stage of polymerization is certainly high but is considerably deactivated with the lapse of time, thus incurring a problem in process operations. Consequently, the use of the catalyst of this type is substantially impossible for the purpose of block copolymerization where a relatively longer polymerization time is required.

To improve this drawback, a modified process is proposed in the above mentioned Japanese Laid-open Patent Appln. No. Sho. 54-94590. As is evident from the disclosure of this reference, it is required in this process to use an ester of an organic monocarboxylic acid not only in the preparation of the catalyst but also on polymerization. In general, the ester of an organic monocarboxylic acid contained in the catalyst is decreased by the treatment with the titanium halide or the washing with an organic solvent to such an amount that the esteric odor of the resultant polymer is almost negligible. It is a current status, however, that the amount of the ester of an organic monocarboxylic acid used in the polymerization step of olefins is much more than that contained in the catalyst so that almost all of the ester will be included in the resultant polymer when the polymerization is carried out in a gaseous or liquid monomer. It can be said, therefore, that the problem of odor in the resultant polymer will not be solved so far as the ester is used in the polymerization step. As is evident from Example 1(A), (B) and (C) of this reference, the process disclosed therein requires troublesome and complicate operations in the preparation of the catalyst and the polymerization of olefins. Further, the catalyst itself is not satisfactory from the practical point of view as described above, particularly in maintaining the activity.

Under the above circumstances, therefore, there is a great demand in this art for developing a new catalyst for the polymerization of olefins which is markedly improved in any of the polymerization activity, stereospecific performance, maintaining of the activity for a long period of polymerization time and influence of chlorine on the resultant polymer to a satisfactory level in the actual commercial scale production of olefin polymers, especially stereoregular olefin polymers always in a high yield. Till now, however, such demand has not yet been fulfilled.

BRIEF SUMMARY OF THE INVENTION

Accordingly, it is an object of the present invention to provide a new catalyst for the polymerization of olefins which enables the production of highly stereoregular polymers in a good yield.

It is another object of the present invention to provide a new catalyst for the polymerization of olefins which overcomes drawbacks of the prior art catalysts incurring problems of corrosion and odor in the resultant polymer.

It is still another object of the present invention to provide a new catalyst of the polymerization of olefins which maintains catalyst activity for a long period of polymerization time.

It is further object of the present invention to use the catalyst for the production of olefin polymers, especially those of stereoregular structure.

It is still further object of the present invention to provide a specific solid catalyst component for the preparation of the new catalyst.

Other and further objects, features and advantages of the present invention will be apparent more fully from the following description.

Taking the above circumstances into consideration, the present inventors have made extensive researches for developing a new catalyst for the polymerization of olefins, which overcomes the various drawbacks seen in the prior art catalysts and enables the production of highly stereoregular polymers in a good yield over a prolonged polymerization time without being deactivated. As a result of such extensive researches, it has now been found surprisingly that a catalyst prepared by combining a 2,6-dialkyl- or 2,2,6,6-tetraalkyl-piperidine derivative and an organoaluminum compound with a specific solid catalyst component having been prepared by bringing a co-ground product of a substance obtained by reacting magnesium with at least two molar proportion of an alkyl monohalide in the absence of a solvent but in the presence of iodine and a dialkyl phthalate and optionally existing titanium tetrachloride into contact with titanium tetrachloride in the presence or absence of an aromatic hydrocarbon and/or halohydrocarbon, has a high catalytic activity combined with stereospecific performance over a prolonged polymerization time without being deactivated and scarcely incurs problems of corrosion resulting from residual halogen and odor resulting from the use of an aromatic monocarboxylic ester in the resultant polymer. The present invention has been accomplished on the basis of the above finding.

DETAILED DESCRIPTION OF THE INVENTION

In accordance with the present invention, there is provided a catalyst for the polymerization of olefins which comprises a specific solid catalyst component (A), a piperidine derivative (B) and an organoaluminum compound (C).

In accordance with one embodiment of the present invention, there is provided a catalyst for the polymerization of olefins which comprises:

($A_1$) a solid catalyst component prepared by bringing a co-ground product of a substance (a) obtained by reacting magnesium with at least two molar proportion of an alkyl monohalide in the absence of a solvent but in the presence of iodine and a dialkyl phthalate (b) into contact with titanium tetrachloride, (B) a disubstituted or tetrasubstituted piperidine derivative of the general formula:

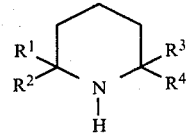

wherein $R^1$ and $R^3$ are the same or different and each stands for an alkyl group and $R^2$ and $R^4$ both stand for hydrogen atoms or both stand for the same or different alkyl groups, and (C) an organoaluminum compound of the general formula:

wherein R is an alkyl group, Q and Q' may be the same or different and each represents R or X, and X is a halogen atom.

In accordance with another embodiment of the present invention, there is provided a catalyst for the polymerization of olefins which comprises:

($A_2$) a solid catalyst component prepared by bringing a co-ground product of a substance (a) obtained by reacting magnesium with at least two molar proportion of an alkyl monohalide in the absence of a solvent but in the presence of iodine, a dialkyl phthalate (b) and titanium tetrachloride (c) into contact with titanium tetrachloride;

(B) a disubstituted or tetrasubstituted piperidine derivative of the general formula:

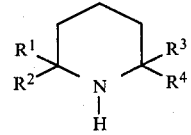

wherein $R^1$ and $R^3$ are the same or different and each stands for an alkyl group and $R^2$ and $R^4$ both stand for hydrogen atoms or both stand for the same or different alkyl groups, and (C) an organoaluminum compound of the general formula:

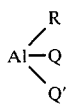

wherein R is an alkyl group, Q and Q' may be the same or different and each represents R or X, and X is a halogen atom.

In accordance with still another embodiment of the present invention, there is provided a catalyst for the polymerization of olefins which comprises:

(A₃) a solid catalyst component prepared by bringing a co-ground product of a substance (a) obtained by reacting magnesium with at least two molar proportion of an alkyl monohalide in the absence of a solvent but in the presence of iodine, a dialkyl phthalate (b) and titanium tetrachloride (c) into contact with titanium tetrachloride in the presence of an aromatic hydrocarbon and/or halohydrocarbon (d) which is liquid at normal temperature;

(B) a disubstituted or tetrasubstituted piperidine derivative of the general formula:

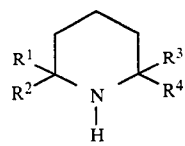

wherein $R^1$ and $R^3$ are the same or different and each stands for an alkyl group and $R^2$ and $R^4$ both stand for hydrogen atoms or both stand for the same or different alkyl groups, and (C) an organoaluminum compound of the general formula:

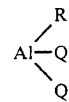

wherein R is an alkyl group, Q and Q' may be the same or different and each represents R or X, and X is a halogen atom.

By the term "polymerization" merely used herein is meant any type of the polymerizations including homopolymerization and copolymerization of olefins as well as any mode of the polymerization including gas or bulk polymerization in the absence of any polymerization solvent and slurry or solution polymerization in the presence of a polymerization solvent.

The catalyst of the present invention is characterized throughout the above three embodiments by using as a main ingredient the specific new solid catalyst component (A₁), (A₂) or (A₃) together with the other ingredients (B) and (C). These solid catalyst components (A₁) (A₂) and (A₃) are different in composition from one another and are generally termed as the solid catalyst component (A). This solid catalyst component (A) alone can be preserved without any substantial deactivation, for example, in a powdery form in vacuo or in an inert medium and may be mixed with the other ingredients (B) and (C) to prepare the catalyst just before the polymerization of an olefin.

In further embodiment of the present invention, therefore, there is provided the new catalyst component (A), i.e. the component (A₁), (A₂) or (A₃), used in the above three embodiments of the catalyst of the present invention.

The solid catalyst component (A) is prepared by co-grinding the substance (a) which is a reaction product of magnesium and a dialkyl phthalate (b) optionally with titanium tetrachloride (c) to form a co-ground product and bringing it into contact with titanium tetrachloride in the presence or absence of an aromatic hydrocarbon and/or halohydrocarbon (d). In the preparation of the co-ground product, the substance (a) has to be co-ground with the dialkyl phthalate (b) since mere mixing of the solely ground substance (a) with the solely ground dialkyl phthalate (b) fails to prepare a solid catalyst component (A) possessing high catalytic activity.

In the present invention, therefore, the grinding (or pulverization) of the substance (a), the dialkyl phthalate (b) and the optional titanium tetrachloride (c) has to be carried out simultaneously in the state of a mixture of these constituents. Such mode of grinding is expressed herein by using the term "co-grinding". Thus, the term "co-ground product" is used herein to mean a product obtained by co-grinding of plural substances.

The magnesium is used in a metallic state for the preparation of the substance (a). The magnesium can thus be in the form of a lump, ribbon granule or powder. Considering the reactivity with the alkyl monohalide, the magnesium is preferably in the form of powder which has desirably been prepared freshly. Such powdery magnesium metal is commercially available and may have a particle diameter from several microns to several hundred microns.

The alkyl monohalide (or simply halide) to be reacted with the magnesium for the preparation of the substance (a) is liquid at room temperature and has 2–12, preferably 3–8 carbon atoms. Such alkyl halide which may have a straight chain or a branched chain is well known and commercially available. Preferable examples of the alkyl halide include n-propyl chloride, isopropyl chloride, n-butyl chloride, isobutyl chloride, pentyl chloride, hexyl chloride and octyl chloride as well as the corresponding bromide.

The dialkyl phthalate (b) [referred to hereinafter simply as the substance (b)] used for the preparation of the solid catalyst component (A) is generally represented by the general formula:

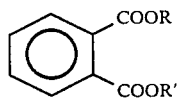

wherein R and R' may be the same or different and each represents a $C_1$–$C_8$ alkyl group which may be branched at any desired position. Preferably, R and R' and $C_1$–$C_5$ alkyl groups which may be branched at any desired position. Illustrative of the preferable dialkyl ester are, for example, dimethyl phthalate, diethyl phthalate, dipropyl phthalate, diisopropyl phthalate, dibutyl phthalate, diisobutyl phthalate, diamyl phthalate, diisoamyl phthalate, methyl ethyl phthalate, methyl propyl phthalate, methyl butyl phthalate, methyl isobutyl phthalate, ethyl propyl phthalate, ethyl butyl phthalate, ethyl isobutyl phthalate, propyl butyl phthalate, propyl isobutyl phthalate, propyl amyl phthalate and butyl amyl phthalate. Among these diesters, lower ($C_2$–$C_4$) dialkyl diesters wherein R and R' are identical with each other are most preferable, such as diethyl phthalate, dipropyl phthalate, dibutyl phthalate and diisobutyl phthalate.

Titanium tetrachloride to be contacted with the co-ground product is commercially available or can be prepared at need according to the method known per se. The titanium tetrachloride is desirably as pure as possible but it may contain a trace of incidental impurities. In addition to the titanium tetrachloride to be contacted with the co-ground product, a certain amount of titanium tetrachloride may be used for the preparation of the co-ground product in case of the preparation of the solid catalyst component ($A_2$) and ($A_3$) The titanium tetrachloride to be co-ground with the substances (a) and (b) is referred to herein as the titanium tetrachloride (c) or simply as the substance (c) and is differentiated from the titanium tetrachloride to be contacted with the co-ground product.

The aromatic hydrocarbon and/or halohydrocarbon (d) [referred to hereinafter simply as the substance (d)] to be coexistent optionally with the titanium tetrachloride to be contacted with the co-ground product is normally liquid and should not react with the other ingredients. Illustrative of the substance (d) are, for example, benzene, toluene, xylene, chlorobenzene, bromobenzene, o-dichlorobenzene, o-chlorotoluene and a mixture of these. Among these, benzene, toluene and chlorobenzene or a mixture thereof are preferable.

The piperidine derivative used as the ingredient (B) in the present invention is a 2,6-disubstituted or 2,2,6,6-tetrasubstituted piperidine generally represented by the following general formula:

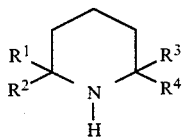

wherein $R^1$ and $R^3$ are the same or different and each stands for an alkyl group and $R^2$ and $R^4$ both stand for hydrogen atoms or both stand for the same or different alkyl groups.

Preferably, the alkyl group is a $C_1$–$C_8$, more preferably $C_1$–$C_4$ alkyl group such as methyl, ethyl, propyl, isopropyl, butyl or isobutyl. The piperidine derivative is preferably 2,6-disubstituted or 2,2,6,6-tetrasubstituted with the same alkyl groups, and preferable examples of such piperidine derivatives include 2,6-dimethylpiperidine, 2,6-diethylpiperidine, 2,6-dipropylpiperidine, 2,6-diisopropylpiperidine, 2,6-dibutylpiperidine, 2,6-diisobutylpiperidine, 2,2,6,6-tetramethylpiperidine, 2,2,6,6-tetraethylpiperidine, 2,2,6,6-tetrapropylpiperidine, 2,2,6,6-tetraisopropylpiperidine and 2,2,6,6-tetrabutylpiperidine. Among these, 2,2,6,6-tetramethylpiperidine is particularly preferable. These piperidine derivatives are commercially available or can be prepared according to the method known per se.

The organoaluminum compound used as the ingredient (C) in the present invention is represented by the general formula:

wherein R is a $C_1$–$C_8$ alkyl group, Q and Q' may be the same or different and each represents R or X, and X is a halogen atom. Thus, the organoaluminum compound includes a trialkylaluminum, a dialkylaluminum halide and an alkylaluminum dihalide as well as a mixture of these aluminum compounds. Preferable examples of the organoaluminum compound include triethylaluminum, tripropylaluminum, triisopropylaluminum, tributylaluminum, triisobutylaluminum, diethylaluminum chloride, dipropylaluminum chloride, diisopropylaluminum chloride, dibutylaluminum chloride, ethylaluminum dichloride, propylaluminum dichloride, butylaluminum dichloride and the corresponding bromides and dibromides. Particularly preferable are trialkylaluminums with triethylaluminum and triisobutylaluminum being most preferable.

In the reaction for preparing the substance (a) wherein magnesium metal preferably in powdery form is reacted with the alkyl halide in the absence of any solvent but in the presence of a small amount of iodine, it is necessary to use the alkyl halide in an amount of at least 2 molar proportion per mol of the magnesium. If the amount of the alkyl halide is less than 2 molar proportion per mol of magnesium, it is impossible to obtain the substance (a) which affords a catalyst possessing the expected performance. The use of iodine is necessary for promoting the reaction between the magnesium metal and the alkyl monohalide. For this purpose, iodine is used in an amount of 0.001–1 g per gram of the magnesium. No particular limitation is set for the reaction temperature and reaction time as far as the reaction proceeds satisfactorily. However, this reaction is carried out usually at a temperature above 20° C. for at least 10 minutes, preferably above 40° C. for at least 30 minutes. The substance (a) obtained by this reaction shows absorption bands of the alkyl group in IR spectrum. This reaction is carried out preferably in an inert gas atmosphere and in the absence of moisture.

The solid catalyst component (A) of the present invention involves the three different types ($A_1$), ($A_2$) and ($A_3$) and is prepared from the substances (a), (b) and titanium tetrachloride optionally together with the substance (d) according to three alternative processes. In the preparation of the solid catalyst component ($A_1$) as a fundamental embodiment, the substance (a) is subjected to a co-grinding treatment together with the substance (b) to form a co-ground product and the product is then brought into contact with titanium tetrachloride. In the preparation of the solid catalyst component ($A_2$) as a second embodiment, the substance (a) is co-ground together with the substances (a) and (c) to form a co-ground product which is then brought into contact with titanium tetrachloride. In the preparation of the solid catalyst component ($A_3$) as a third embodiment, the substances (a), (b) and (c) are co-ground together as in the above second embodiment and the resultant co-ground product is then brought into contact with the titanium tetrachloride in the presence of the substance (d). In these embodiments the co-grinding treatment is carried out according to a conventional grinding or pulverizing method using a mill preferably in an inert gas atmosphere and in the absence of moisture. For example, the substance (a) together with the substance (b) alone or in mixture with the substance (c) are placed in a mill and co-ground in nitrogen atmosphere free from moisture for a given period of time. Any type of the mills such as ball mills, vibration mills and colloid mills can be used for this treatment. The use of a ball mill or a vibration mill is preferable. The time required for the co-grinding treatment is at least 10 minutes, preferably at least 30 minutes. The treatment is usually conducted in the absence of any diluent at room temperature.

In the preparation of the solid catalyst component (A) [i.e. the component $(A_1)$, $(A_2)$ or $(A_3)$, each substance (or compound) can be employed in any desired amount unless the solid catalyst component (A) derived from these substances be influenced adversely in its performance. Thus, no specific limitation exists in the proportion of the substances (a), (b) and (c), titanium tetrachloride and the substance (d) optionally used, so far as the expected performance can be obtained in the resultant solid catalyst component (A). Usually, however, the substance (b) is used in an amount of 0.01–1 g per gram of the substance (a), while the substance (c) is used in an amount of 0.01–1 g per gram of the substance (a) when the substance (c) is co-ground with the substances (a) and (b) in the second and third embodiments $(A_2)$ and $(A_3)$ In the contact treatment of the co-ground product with the titanium tetrachloride, the latter is used in an amount of at least 0.1 g, preferably at least 1 g per gram of the substance (a). In case the substance (d) is employed together with the titanium tetrachloride, in the third embodiment $(A_3)$, it is used in an amount of 0.01–100 ml, preferably 0.1–10 ml per milliliter of the titanium tetrachloride. If the above proportions in the solid catalyst component (A) are significantly greater or smaller than the above described ranges, the polymerization activity and the isotacticity of the resultant polymer may be reduced.

In any of the embodiments of the present invention, the preparation of the solid catalyst component (A) has to be carried out in a specific order of succession as described above with respect to the use of the substances for the reaction to afford a catalyst with a high polymerization activity. The contact treatment for this reaction is carried out at a temperature ranging from −10° C. to the boiling point of the titanium tetrachloride for a period from 10 minutes to 100 hours. A preferable reaction temperature is about 15°–120° C., and a preferable reaction time is about 1–10 hours, although it varies according to the temperature adopted. If the temperature for contacting the co-ground product with the titanium tetrachloride is lower than −10° C., overall catalytic performance of the resultant catalyst will become too low to be practical. On the other hand, if the temperature exceeds the boiling point of the titanium tetrachloride, the polymerization activity will be reduced. If the contact time of the co-ground product with the titanium tetrachloride is shorter than 10 minutes, both the polymerization activity and the stereospecific performance will be reduced. If the contact time exceeds 100 hours, no additional advantage will be obtained in proportion to such extension of the contact time. Thus, the upper limit of the contact time is set only for economical reasons. After this treatment, the resultant product may be brought into further contact with the titanium tetrachloride and repeatedly reacted together in the presence or absence of the substance (d).

This contact treatment is carried out preferably in an inert gas atmosphere and in the absence of moisture as well. The solid catalyst component (A) thus obtained may be washed, if desired, with an inert organic solvent. Preferable examples of the inert organic solvent utilizable for this washing involves normally liquid saturated aliphatic hydrocarbons such as n-hexane or n-heptane. Nitrogen is preferably used as the inert gas.

Each of the solid catalyst components $(A_1)$, $(A_2)$ and $(A_3)$ thus prepared is then combined with the ingredient (B), i.e. the disubstituted or tetrasubstituted piperidine derivative and the ingredient (C), i.e. the organoaluminum compound to form the catalyst of the present invention for the polymerization of olefins. The ingredients (B) and (C) may be combined with the solid catalyst component (A) to form the catalyst just prior to polymerization of an olefin in a polymerization reactor.

In the preparation of the catalyst, the ingredient (C) is used in an amount of 1–1000 mols per titanium atom in the solid catalyst component (A) while the ingredient (B) is used in an amount of 0.005–1.0 mol per mol of the ingredient (C). If the amount of the ingredient (C) is less than 1 mol per titanium atom of the solid catalyst component, the catalytic activity of the resultant catalyst will become too low to be practical. The upper limit of 1000 mols per titanium atom is set only for economical reasons since no additional merit will be obtained even if the amount of the ingredient (C) exceeds 1000 mols per titanium atom. If the amount of the ingredient (B) is less than 0.005 mol per mol of the ingredient (C), the resultant catalyst will exhibit very low stereospecific performance. On the other hand, if the amount of the ingredient (B) exceeds 1.0 mol per mol of the ingredient (C), the catalytic activity of the resultant catalyst will become too low to be practical.

The polymerization of olefins by the aid of the catalyst of the present invention can be carried out according to a usual method for gas or bulk polymerization in the absence of an organic solvent or for slurry or solution polymerization in the presence of an organic solvent. The olefin utilizable for the polymerization is $C_2$–$C_4$ α-olefins and involves ethylene, propylene, 1-butene and a mixture of these olefins. Such olefin can be used in either gaseous or liquid state.

The polymerization temperature adopted in this case is lower than 200° C., preferably lower than 100° C. while the polymerization pressure is less than 100 kg/cm$^2$G, preferably less than 50 kg/cm$^2$G. These conditions generally vary according to the sort of olefins and the type of polymerization adopted and can be selected suitably by those skilled in the art, taking the various factors for polymerization into consideration.

In case the polymerization of olefins is carried out with the aid of the catalyst of this invention possessing unexpectedly high catalytic activity combined with high stereospecific performance, the resultant polymers have a significantly high stereoregularity and any residue of the catalyst in the resultant polymers can be controlled to an extremely low level. In addition, the amount of residual chlorine in the resultant polymers is extremely small so that any influence of chlorine on the polymer can be eliminated to such a degree that any deashing treatment is utterly unnecessary as after-treatment. Chlorine contained in the resultant polymer can cause on one hand corrosion of apparatus used for granulation and shaping of the polymer and on the other hand deterioration and yellowing of the resultant polymer itself. Thus, such serious reduction of the chlorine content is indeed meaningful and industrially advantageous for the production of olefin polymers.

Further, the use of an ester of an aromatic monocarboxylic acid which is used in a relatively large amount as an electron donor in the prior art methods for polymerization of olefins can be omitted in the present invention to solve the problem of "ester odor" in the resultant olefin polymers.

The specific solid catalyst component of the present invention can be stored in an inert atmosphere or medium for a long period of time without being deactivated. This brings about such an advantage that the solid catalyst component can be transported without lowering its performance.

Highly active supported catalysts in the prior art methods commonly have such drawback that their catalytic activity per unit time is considerably reduced with the lapse of time. In case of the catalyst of the present invention, however, reduction in catalytic activity per unit time of the catalyst with the lapse of time is extremely low as compared with the prior art supported catalysts so that the catalyst is advantageously used for block copolymerization of olefins for which a longer polymerization time is necessary. The catalyst of the present invention exhibits significant increase in catalytic activity when a higher polymerization pressure is adopted, and can thus be utilized widely for bulk polymerization and gas polymerization which have been watched in recent years. Moreover, olefin polymers of high stereoregularity can be produced by the aid of the catalyst of the present invention.

It is generally admitted in the production of olefin polymers in industrial scale, that hydrogen is allowed to be co-existent in the polymerization system to control the melt index of the resultant polymer. However, any of the prior art catalysts comprising an organic monocarboxylic acid ester and a catalyst component involving magnesium halide as carrier has such a drawback that its activity and stereospecific performance are seriously deteriorated in the co-existence of hydrogen in the polymerization system. In contrast, the catalyst of the present invention achieves a significant merit that its catalytic activity and stereospecific performance are scarcely deteriorated in case of performing the polymerization of olefins in the co-existence of hydrogen even if the melt index of the resultant polymer is extremely high. Such advantageous effect has strongly been desired in this art.

In the production of olefin polymers in commercial scale, the bulk density of the resultant polymer is one of the important factors since this property affects greatly on the capacities of polymerization equipments and after-treatment facilities. It is an additional merit of the present invention that an excellent effect is exhibited also in this factor. Thus, the catalyst of the present invention contributes greatly in the industrial production of highly stereoregular olefin polymers in higher quality.

The present invention will now be illustrated in more detail by way of Examples and Comparative Examples.

EXAMPLE 1

(1) Preparation of the substance (a):

In a 2.0 liter round-bottomed flask equipped with a stirrer, the air in which had been substituted sufficiently with nitrogen, were placed 30 g of magnesium metal powder, 1.0 g of iodine and 1.2 liters of n-butyl chloride. The mixture was reacted together for 5 hours at the boiling point of n-butyl chloride. After completion of the reaction, the supernatant liquid was eliminated and the reaction product was washed three times each with 500 ml of n-butyl chloride and dried under reduced pressure to obtain a substance (a) in powdery form.

(2) Preparation of the solid catalyst component (A):

In a 1.0 liter vibrating mill pot charged up to 4/5 of the whole capacity with stainless steel balls of 25 mm in diameter were placed in nitrogen atmosphere with 20 g of the substance (a) in powdery form obtained in the above step (1) and 5.0 ml of dibutyl phthalate. The mixture was subjected to a co-grinding treatment operated for 17 hours at a vibration number of 1430 V.p.m. and an amplitude of 3.5 mm.

In a 500 ml round-bottomed flask equipped with a stirrer, the air in which had been substituted sufficiently with nitrogen, was placed 5 g of the solid composition obtained by the above co-grinding treatment. To the solid composition was added 200 ml of $TiCl_4$, and the mixture was heated up to 120° C. and kept for 2 hours. After completion of the reaction, the supernatant liquid was eliminated and the reaction product was incorporated with 200 ml of additional $TiCl_4$ and reacted together for 2 hours at 120° C. After completion of the reaction, the reaction mixture was cooled down to 40° C. and the solid product was washed ten times each with 200 ml of n-heptane whereby a solid catalyst component (A) was obtained.

In this case, the titanium content in the solid catalyst component (A) was measured whereby the content was determined as 1.61% by weight.

(3) Polymerization:

In a 2.0 liter autoclave equipped with a stirring device, the air in which had been replaced entirely with nitrogen, were placed 193 mg of triethyl aluminum, 24 mg of 2,2,6,6-tetramethylpiperidine and 6.0 mg of the above described solid catalyst component (A). The autoclave was then charged with 1.8 liters of gaseous hydrogen and 1.4 liters of liquefied propylene, and a polymerization reaction was carried out for one hour at 70° C. After completion of the polymerization reaction, the resultant polymer was dried under reduced pressure at 80° C. and the amount obtained was designated as [A]. The polymer was extracted for 6 hours with boiling n-heptane to obtain a polymer insoluble therein and the amount of this insoluble polymer was designated as [B]. The polymerization activity [C] per solid catalyst component used is calculated according to the following equation:

$$[C] = \frac{[A] (g)}{\text{Amount of the solid catalyst component (g)}}$$

The yield [D] of the total crystalline polymer is calculated according to the following equation:

$$[D] = [B]/[A] \times 100 \ (\%).$$

A result of the polymerization is shown in Table 1 wherein the content of residual chlorine is designated as [E], the melt index (MI) of the polymer as [F] and the bulk density of the polymer as [G].

EXAMPLE 2

An experiment was carried out in the same manner as described in Example 1 except that the polymerization time was 30 minutes. A result of the experiment is shown in Table 1.

EXAMPLE 3

An experiment was carried out in the same manner as described in Example 1 except that the polymerization reaction was carried out in the following manner:

In a 2.0 liter autoclave equipped with a stirring device, the air in which had been replaced entirely by nitrogen, was placed 700 ml of n-heptane. The autoclave was charged successively with 301 mg of triethyl aluminum, 37 mg of 2,2,6,6-tetramethylpiperidine and 14.0 mg of the solid catalyst component prepared in the manner as described in Example 1 while maintaining the nitrogen atmosphere. Into the autoclave was then charged 150 ml of gaseous hydrogen and the temperature is allowed to rise at 70° C. Gaseous propylene was introduced into the autoclave and subjected to a polymerization reaction for 1 hour while maintaining the pressure at 6 kg/cm²G. After completion of the polymerization reaction, the resultant solid polymer was collected by filtration and dried under reduced pressure while being warmed at 80° C. On the other hand, the filtrate was concentrated to obtain a polymer having been dissolved in the polymerization solvent, and the amount of the polymer was designated as [H] while the amount of the solid polymer was designated as [I]. The solid polymer was extracted with boiling n-heptane for 6 hours to obtain a polymer insoluble in n-heptane, and the amount of the insoluble polymer was designated as [J].

The polymerization activity [K] per solid catalyst component (A) is calculated according to the following equation:

$$[K] = \frac{([H] + [I]) \, (g)}{\text{Amount of the solid catalyst component (g)}}$$

The yield [L] of the crystalline polymer is calculated according to the following equation:

$$[L] = [J]/ \times 100 \, (\%)$$

The yield [M] of the total crystalline polymer is calculated according to the following equation:

$$[M] = \frac{[J]}{[H] + [I]} \times 100 \, (\%)$$

A result of the polymerization reaction is shown in Table 2 wherein the content of residual chlorine is designated as [N], the melt index (MI) of the polymer as [O] and the bulk density of the polymer as [P].

EXAMPLE 4

An experiment was carried out in the same manner as described in Example 3 except that the polymerization time was 2 hours. A result of the experiment is shown in Table 2.

EXAMPLE 5

An experiment for the preparation of the solid catalyst component was carried out in the same manner as described in Example 1 except that in place of dibutyl phthalate, dipropyl phthalate was used in the same amount. In this case, the titanium content in the solid catalyst component was 1.78% by weight. An experiment for the polymerization reaction was carried out in the same manner as described in Example 1. A result of the experiment is shown in Table 1.

EXAMPLE 6

The preparation of the solid catalyst component was carried out in the same manner as described in Example 1 except that 7 ml of dibutyl phthalate was used in place of 5 ml of dibutyl phthalate. In this case, the titanium content in the solid catalyst component was 2.08% by weight. An experiment for the polymerization reaction was carried out in the same manner as described in Example 1. A result of the experiment is shown in Table 1.

EXAMPLE 7

The preparation of the solid catalyst component was carried out in the same manner as described in Example 1 except that diisobutyl phthalate was used in place of dibutyl phthalate. In this case, the titanium content in the solid catalyst component was 1.64% by weight. An experiment for the polymerization reaction was carried out in the same manner as described in Example 1. A result of the experiment is shown in Table 1.

EXAMPLE 8

In a 1.0 liter vibrating mill pot charged up to 4/5 of the whole capacity with stainless steel balls of 25 mm in diameter were placed in nitrogen atmosphere 20 g of the powdery substance (a) obtained in Example 1, 7.5 ml of dibutyl phthalate and 4.0 ml of TiCl$_4$. The mixture was subjected to a co-grinding treatment operated for 17 hours at a vibration number of 1430 V.p.m. and an amplitude of 3.5 mm.

In a 500 ml round-bottomed flask equipped with a stirrer, the air in which had been substituted sufficiently with gaseous nitrogen, was placed 5 g of the solid composition obtained in the above co-grinding treatment. To the solid composition was added 200 ml of TiCl$_4$, and the mixture was heated up to 120° C. and kept for 2 hours. After completion of the reaction, the supernatant liquid was eliminated and the reaction product was incorporated with 200 ml of additional TiCl$_4$ and reacted for 2 hours at 120° C. After completion of the reaction, the reaction mixture was cooled down to 40° C. and the solid product was washed 10 times each with 200 ml of n-heptane whereby a solid catalyst component (A) was obtained. In this case, the titanium content in the solid catalyst component (A) was measured whereby the content was determined as 2.26% by weight.

An experiment for the polymerization reaction was carried out in the same manner as described in Example 1 except that 3.0 mg of the solid catalyst component was used. A result of the experiment is shown in Table 1.

EXAMPLE 9

An experiment was carried out in the same manner as described in Example 8 except that the polymerization time was 30 minutes. A result of the experiment is shown in Table 1.

EXAMPLE 10

An experiment was carried out in the same manner as described in Example 3 except that 10.0 mg of the solid catalyst component prepared in the manner described in Example 8 was used. A result of the experiment is shown in Table 2.

EXAMPLE 11

An experiment was carried out in the same manner as described in Example 10 except that the polymerization time was 2 hours. A result of the experiment is shown in Table 2.

EXAMPLE 12

An experiment for the preparation of the solid catalyst component was carried out in the same manner as described in Example 8 except that in place of dibutyl phthalate, dipropyl phthalate was used in the same amount. In this case, the titanium content in the solid catalyst component was 2.63% by weight. An experiment for the polymerization reaction was carried out in the same manner as described in Example 8. A result of the experiment is shown in Table 1.

EXAMPLE 13

The preparation of a solid catalyst component was carried out in the same manner as described in Example 8 except that the reactions (2 times) after addition of 200 ml of $TiCl_4$ were both carried out at 130° C. In this case, the titanium content in the solid catalyst component was 2.45% by weight. An experiment for the polymerization reaction was carried out in the same manner as described in Example 8. A result of the experiment is shown in Table 1.

EXAMPLE 14

In a 1.0 liter vibrating mill pot charged up to 4/5 of the capacity with stainless steel balls of 25 mm in diameter were placed in gaseous nitrogen atmosphere 20 g of the powdery substance (a) obtained in Example 1, 7.5 ml of dibutyl phthalate and 4.0 ml of $TiCl_4$. The mixture was subjected to a co-grinding treatment conducted for 17 hours at a vibration number of 1430 V.p.m. and an amplitude of 3.5 mm.

In a 500 ml round-bottomed flask equipped with a stirrer, the air in which had been replaced sufficiently by gaseous nitrogen, was placed 5 g of the solid composition obtained in the above co-grinding treatment. To the solid composition were added 50 ml of $TiCl_4$ and 50 ml of toluene, and the mixture was heated up to 115° C. and kept for 2 hours. After completion of the reaction, the supernatant liquid was eliminated and the solid product was incorporated with 50 ml of additional $TiCl_4$ and reacted together at 115° C. for 2 hours. After completion of the reaction, the reaction mixture was cooled down to 40° C. and the solid product was washed 10 times each with 200 ml of n-heptane whereby a solid catalyst component was obtained. In this case, the titanium content of the solid catalyst component was measured whereby the content was determined as 2.17% by weight.

An experiment for the polymerization reaction was carried out in the same manner as described in Example 1 except that 3.0 mg of the above solid catalyst component was used. A result of the experiment is shown in Table 1.

EXAMPLE 15

An experiment was carried out in the same manner as described in Example 14 except that the polymerization time was 30 minutes. A result of the experiment is shown in Table 1.

EXAMPLE 16

An experiment was carried out in the same manner as described in Example 3 except that 10.0 mg of the solid catalyst component prepared by the method described in Example 14 was used. A result of the experiment is shown in Table 2.

EXAMPLE 17

An experiment was carried out in the same manner as described in Example 16 except that the polymerization time was 2 hours. A result of the experiment is shown in Table 2.

EXAMPLE 18

An experiment for the preparation of the solid catalyst component was carried out in the same manner as described in Example 14 except that in place of dibutyl phthalate, dipropyl phthalate was used in the same amount. In this case, the titanium content in the solid catalyst component was 2.13% by weight. An experiment for the polymerization reaction was carried out in the same manner as described in Example 14. A result of the experiment is shown in Table 1.

EXAMPLE 19

The preparation of the solid catalyst component was carried out in the same manner as described in Example 14 except that 5.0 ml of dipropyl phthalate, 2.0 ml of $TiCl_4$ were used in place of 7.5 ml of dibutyl phthalate and 4.0 ml of $TiCl_4$, respectively. In this case, the titanium content in the solid catalyst component was 2.13% by weight. An experiment for the polymerization reaction was carried out in the same manner as described in Example 14. A result of the experiment is shown in Table 1.

COMPARATIVE EXAMPLE 1

Commercially available $MgCl_2$ (20 g) and dibutyl phthalate (5.0 ml) were pulverized under the same condition as described in Example 1. In a 500 ml glass vessel was then placed in gaseous nitrogen atmosphere 5 g of the pulverized composition. Then, 200 ml of $TiCl_4$ was added and the mixture was reacted together under agitation for 2 hours at 120° C. After completion of the reaction, the supernatant liquid was eliminated and the reaction product was incorporated with 200 ml of additional $TiCl_4$ and reacted together for 2 hours at 120° C.

After completion of the reaction, the reaction mixture was cooled down to 40° C. and the solid product was washed 10 times with 200 ml of n-heptane whereby a solid catalyst component is obtained. In this case, the titanium content in this solid catalyst component was measured whereby the content was determined as 1.64% by weight.

An experiment for the polymerization reaction was carried out in the same manner as described in Example 1 except that 6.0 mg of the above solid catalyst component was used. A result of the experiment is shown in Table 1.

COMPARATIVE EXAMPLE 2

An experiment was carried out in the same manner as described in Comparative Example 1 except that the polymerization time was 30 minutes. A result of the experiment is shown in Table 1.

COMPARATIVE EXAMPLE 3

An experiment was carried out in the same manner as described in Comparative Example 1 except that the polymerization reaction was carried out in the same manner as described in Example 3. A result of the experiment is shown in Table 2.

Comparison of Examples 1 and 2 with Comparative Examples 1 and 2 apparently reveals that the catalyst of the present invention shows a very little reduction in catalytic activity with the lapse of polymerization time. Comparison of Examples 1 and 3 with Comparative Examples 1 and 3 apparently reveals that the catalyst of the present invention is larger in increase of catalytic activity in case of adopting a higher polymerization pressure.

It is understood that the preceding representative examples may be varied within the scope of the present specification both as to reactants and reaction conditions, by those skilled in the art to achieve essentially the same results.

As many widely different embodiments of this invention may be made without departing from the spirit and scope thereof, it is to be construed that this invention is not limited to the specific embodiments thereof except as defined in the appended claims.

TABLE 1

| | Example | | | | | | | |
|---|---|---|---|---|---|---|---|---|
| | 1 | 2 | 5 | 6 | 7 | 8 | 9 | 12 |
| Amount of the total polymer (A) g | 397 | 215 | 376 | 371 | 382 | 296 | 160 | 288 |
| Amount of the polymer insoluble in boiling n-heptane (B) g | 385.1 | 209.0 | 363.6 | 359.5 | 369.2 | 287.2 | 155.3 | 279.3 |
| Polymerization activity per solid catalyst component (C) | 66170 | 35830 | 62670 | 61830 | 63670 | 98700 | 53300 | 96000 |
| Yield of the total crystalline polymer (D) % | 97.0 | 97.2 | 96.7 | 96.9 | 96.6 | 97.0 | 97.1 | 97.0 |
| Residual chlorine in the polymer produced (E) ppm | 9 | 17 | 10 | 10 | 9 | 6 | 11 | 6 |
| MI of the polymer produced (F) | 4.1 | 3.2 | 3.0 | 3.4 | 3.8 | 3.8 | 3.5 | 5.1 |
| Bulk sp. gr. of the polymer produced (G) | 0.48 | 0.46 | 0.48 | 0.47 | 0.47 | 0.47 | 0.46 | 0.46 |

| | Example | | | | | Comparative Example | |
|---|---|---|---|---|---|---|---|
| | 13 | 14 | 15 | 18 | 19 | 1 | 2 |
| Amount of the total polymer (A) g | 277 | 305 | 166 | 297 | 302 | 139 | 86 |
| Amount of the polymer insoluble in boiling n-heptane (B) g | 269.5 | 298.1 | 162.3 | 289.9 | 294.3 | 130.7 | 80.9 |
| Polymerization activity per solid catalyst component (C) | 92300 | 101670 | 55330 | 99000 | 100670 | 23170 | 14330 |
| Yield of the total crystalline polymer (D) % | 97.3 | 97.7 | 97.8 | 97.6 | 97.4 | 94.0 | 94.1 |
| Residual chlorine in the polymer produced (E) ppm | 6 | 6 | 10 | 6 | 6 | 27 | 45 |
| MI of the polymer produced (F) | 4.7 | 2.8 | 3.1 | 2.4 | 3.2 | 5.9 | 3.8 |
| Bulk sp. gr. of the polymer produced (G) | 0.46 | 0.47 | 0.46 | 0.46 | 0.46 | 0.41 | 0.40 |

TABLE 2

| | Example | | | | | | Comparative Example |
|---|---|---|---|---|---|---|---|
| | 3 | 4 | 10 | 11 | 16 | 17 | 3 |
| Amount of the polymer dissolved in the polymerization solvent (H) g | 1.5 | 2.8 | 1.5 | 3.1 | 1.2 | 2.4 | 2.5 |
| Amount of the solid polymer (I) g | 139 | 252 | 113 | 202 | 126 | 225 | 84 |
| Amount of the polymer insoluble in boiling n-heptane (J) g | 135.5 | 246 | 111 | 199 | 124 | 222 | 81 |
| Polymerization activity per solid catalyst component (K) | 10040 | 18200 | 11450 | 20500 | 12700 | 22700 | 6180 |
| Yield of the crystalline polymer (L) % | 97.5 | 97.6 | 98.2 | 98.5 | 98.4 | 98.7 | 96.5 |
| Yield of the total crystalline polymer (M) % | 96.8 | 96.9 | 96.9 | 97.0 | 97.5 | 97.6 | 93.6 |
| Residual chlorine in the polymer produced | 59 | 33 | 49 | 27 | 45 | 25 | 103 |

TABLE 2-continued

|  | Example | | | | | | Comparative Example |
|---|---|---|---|---|---|---|---|
|  | 3 | 4 | 10 | 11 | 16 | 17 | 3 |
| (N) ppm MI of the polymer produced (O) | 2.1 | 1.7 | 3.1 | 2.0 | 2.3 | 2.1 | 8.1 |
| Bulk sp. gr. of the polymer produced (P) | 0.40 | 0.41 | 0.40 | 0.41 | 0.40 | 0.41 | 0.34 |

What is claimed is:

1. A catalyst for the polymerization of olefins which comprises:
   (A) a solid catalyst component prepared by bringing a co-ground product of a substance (a) obtained by reacting magnesium with at least two molar proportion of an alkyl monohalide in the absence of a solvent but in the presence of iodine and a dialkyl phthalate (b) into contact with titanium tetrachloride;
   (B) a disubstituted or tetrasubstituted piperidine derivative of the general formula:

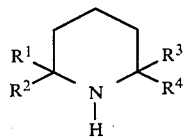

wherein $R^1$ and $R^3$ are the same or different and each stands for an alkyl group and $R^2$ and $R^4$ both stand for hydrogen atoms or both stand for the same or different alkyl groups, and
   (C) an organoaluminum compound of the general formula:

$$Al \begin{matrix} R \\ -Q \\ Q' \end{matrix}$$

wherein R is an alkyl group, Q and Q' may be the same or different and each represents R or X, and X is a halogen atom.

2. A catalyst according to claim 1, wherein the alkyl monohalide is liquid at room temperature and has 3–8 carbon atoms.

3. A catalyst according to claim 1, wherein the dialkyl phthalate (b) is dimethyl phthalate, diethyl phthalate, diisopropyl phthalate, dipropyl phthalate, dibutyl phthalate, diisobutyl phthalate, diamyl phthalate, diisoamyl phthalate, ethyl butyl phthalate, ethyl isobutyl phthalate and ethyl propyl phthalate.

4. A catalyst according to claim 1, wherein the piperidine derivative (B) is 2,6-dialkylpiperidine or 2,2,6,6-tetraalkylpiperidine.

5. A catalyst accoring to claim 1 or 4, wherein the piperidine derivative (B) is used in an amount of 0.005–1.0 mol per mol of the organoaluminum compound (C).

6. A catalyst according to claim 1, wherein the organoaluminum compound (C) is a trialkylaluminum, a dialkylaluminum halide, an alkylaluminum dihalide or a mixture thereof.

7. A catalyst according to claim 1 or 6, wherein the organoaluminum compound (C) is used in an amount of 1–1000 mols per titanium atom in the solid catalyst component (A).

8. A catalyst for the polymerization of olefins which comprises:
   (A) a solid catalyst component prepared by bringing a co-ground product of a substance (a) obtained by reacting magnesium with at least two molar proportion of an alkyl monohalide in the absence of a solvent but in the presence of iodine, a dialkyl phthalate (b) and titanium tetrachloride (c) into contact with titanium tetrachloride,
   (B) a disubstituted or tetrasubstituted piperidine derivative of the general formula:

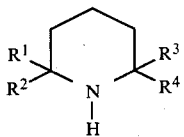

wherein $R^1$ and $R^3$ are the same or different and each stands for an alkyl group and $R^2$ and $R^4$ both stand for hydrogen atoms or both stand for the same or different alkyl groups, and
   (C) an organoaluminum compound of the general formula:

$$Al \begin{matrix} R \\ -Q \\ Q' \end{matrix}$$

wherein R is an alkyl group, Q and Q' may be the same or different and each represents R or X, and X is a halogen atom.

9. A catalyst according to claim 8, wherein the alkyl monohalide is liquid at room temperature and has 3–8 carbon atoms.

10. A catalyst according to claim 8, wherein the dialkyl phthalate (b) is dimethyl phthalate, diethyl phthalate, diisopropyl phthalate, dipropyl phthalate, dibutyl phthalate, diisobutyl phthalate, diamyl phthalate, diisoamyl phthalate, ethyl butyl phthalate, ethyl isobutyl phthalate and ethyl propyl phthalate.

11. A catalyst according to claim 8, wherein the piperidine derivative (B) is 2,6-dialkylpiperidine or 2,2,6,6-tetraalkylpiperidine.

12. A catalyst according to claim 8 or 11, wherein the piperidine derivative (B) is used in an amount of 0.005–1.0 mol per mol of the organoaluminum compound (C).

13. A catalyst according to claim 8, wherein the organoaluminum compound (C) is a trialkylaluminum, a dialkylaluminum halide, an alkylaluminum dihalide or a mixture thereof.

14. A catalyst according to claim 8 or 13, wherein the organoaluminum compound (C) is used in an amount of 1-1000 mols per titanium atom in the solid catalyst component (A).

15. A catalyst for the polymerization of olefins which comprises:
(A) a solid catalyst component prepared by bringing a co-ground product of a substance (a) obtained by reacting magnesium with at least two molar proportion of an alkyl monohalide in the absence of a solvent but in the presence of iodine, a dialkyl phthalate (b) and titanium tetrachloride (c) into contact with titanium tetrachloride in the presence of (d) an aromatic hydrocarbon and/or halohydrocarbon which is liquid at room temperature;
(B) a disubstituted or tetrasubstituted piperidine derivative of the general formula:

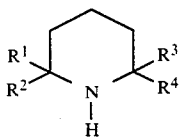

wherein $R^1$ and $R^3$ are the same or different and each stands for an alkyl group and $R^2$ and $R^4$ both stand for hydrogen atoms or both stand for the same or different alkyl groups, and
(C) an organoaluminum compound of the general formula:

wherein R is an alkyl group, Q and Q' may be the same or different and each represents R or X, and X is a halogen atom.

16. A catalyst according to claim 15, wherein the alkyl monohalide is liquid at room temperature and has 3-8 carbon atoms.

17. A catalyst according to claim 16, wherein the dialkyl phthalate (b) is dimethyl phthalate, diethyl phthalate, diisopropyl phthalate, dipropyl phthalate, dibutyl phthalate, diisobutyl phthalate, diamyl phthalate, diisoamyl phthalate, ethyl butyl phthalate, ethyl isobutyl phthalate and ethyl propyl phthalate.

18. A catalyst according to claim 15, wherein the piperidine derivative (B) is 2,6-dialkylpiperidine or 2,2,6,6-tetraalkylpiperidine.

19. A catalyst according to claim 15 or 18, wherein the piperidine derivative (B) is used in an amount of 0.005-1.0 mol per mol of the organoaluminum compound (C).

20. A catalyst according to claim 15, wherein the organoaluminum compound (C) is a trialkylaluminum, a dialkylaluminum halide, an alkylaluminum dihalide or a mixture thereof.

21. A catalyst according to claim 15 or 20, wherein the organoaluminum compound (C) is used in an amount of 1-1000 mols per titanium atom in the solid catalyst component (A).

22. A solid catalyst component for catalysts utilizable for the polymerization of olefins which has been prepared by bringing a co-ground product of a substance (a) obtained by reacting magnesium with at least two molar proportion of an alkyl monohalide in the absence of a solvent but in the presence of iodine and a dialkyl phthalate (b) into contact with titanium tetrachloride.

23. A solid catalyst component according to claim 22, wherein the reaction for obtaining the substance (a) is carried out at a temperature above 20° C., preferably above 40° C.

24. A solid catalyst component according to claim 22 or 23, wherein the reaction for obtaining the substance (a) is carried out for a period of time longer than 10 minutes, preferably longer than 30 minutes.

25. A solid catalyst component according to claim 22, wherein the alkyl monohalide is liquid at room temperature and has 3-8 carbon atoms.

26. A catalyst according to claim 25, wherein the alkyl monohalide is n-propyl chloride, isopropyl chloride, n-butyl chloride, isobutyl chloride, pentyl chloride, hexyl chloride or octyl chloride.

27. A solid catalyst component according to claim 22, wherein the iodine is used in an amount of 0.001-1 g per gram of the magnesium.

28. A solid catalyst component according to claim 22, wherein the dialkyl phthalate (b) is dimethyl phthalate, diethyl phthalate, diisopropyl phthalate, dipropyl phthalate, dibutyl phthalate, diisobutyl phthalate, diamyl phthalate, diisoamyl phthalate, ethyl butyl phthalate, ethyl isobutyl phthalate and ethyl propyl phthalate.

29. A solid catalyst component according to claim 22, wherein the proportion of the dialkyl phthalate (b) to the substance (a) is such that the dialkyl phthalate (b) is used in an amount of 0.01-1 g per gram of the substance (a).

30. A solid catalyst component according to claim 22, wherein the proportion of the titanium tetrachloride to the substance (a) is such that the titanium tetrachloride is used in an amount of at least 0.1 g, preferably at least 1 g per gram of the substance (a).

31. A solid catalyst component according to claim 22, wherein the contact of the co-ground product with the titanium tetrachloride is effected at a temperature from $-10°$ C. to the boiling point of the titanium tetrachloride.

32. A solid catalyst component according to claim 22 or 31, wherein the contact is effected for a period from 10 minutes to 100 hours.

33. A solid catalyst component according to claim 22, or 31, wherein the contact is effected repeatedly.

34. A solid catalyst component for catalysts utilizable for the polymerization of olefins which has been prepared by bringing a co-ground product of a substance (a) obtained by reacting magnesium with at least two molar proportion of an alkyl monohalide in the absence of a solvent but in the presence of iodine, a dialkyl phthalate (b) and titanium tetrachloride (c) into contact with titanium tetrachloride.

35. A solid catalyst component according to claim 34, wherein the reaction for obtaining the substance (a) is carried out at a temperature above 20° C., preferably above 40° C.

36. A solid catalyst component according to claim 34 or 35, wherein the reaction for obtaining the substance (a) is carried out for a period of time longer than 10 minutes, preferably longer than 30 minutes.

37. A solid catalyst component according to claim 34, wherein the alkyl monohalide is liquid at room temperature and has 3-8 carbon atoms.

38. A solid catalyst component according to claim 37, wherein the alkyl monohalide is n-propyl chloride, isopropyl chloride, n-butyl chloride, isobutyl chloride, pentyl chloride, hexyl chloride or octyl chloride.

39. A solid catalyst component according to claim 34, wherein the iodine is used in an amount of 0.001–1 g per gram of the magnesium.

40. A solid catalyst component according to claim 34, wherein the dialkyl phthalate (b) is dimethyl phthalate, diethyl phthalate, diisopropyl phthalate, dipropyl phthalate, dibutyl phthalate, diisobutyl phthalate, diamyl phthalate, diisoamyl phthalate, ethyl butyl phthalate, ethyl isobutyl phthalate and ethyl propyl phthalate.

41. A solid catalyst component according to claim 34, wherein the proportion of the dialkyl phthalate (b) to the substance (a) is such that the dialkyl phthalate (b) is used in an amount of 0.01–1 g per gram of the substance (a).

42. A solid catalyst component according to claim 34, wherein the proportion of the titanium tetrachloride (c) to be co-ground with the substance (a) and the dialkyl phthalate (b) to the substance (a) is such that the titanium tetrachloride (c) is used in an amount of 0.01–1 g per gram of the substance (a).

43. A solid catalyst component according to claim 34, wherein the titanium tetrachloride is used in an amount of at least 0.1 g, preferably at least 1 g per gram of the co-ground product.

44. A solid catalyst component according to claim 34 or 43, wherein the contact of the co-ground product with the titanium tetrachloride is effected at a temperature from −10° C. to the boiling point of the titanium tetrachloride.

45. A solid catalyst component according to claim 34 or 43, wherein the contact of the co-ground product with the titanium tetrachloride is effected for a period from 10 minutes to 100 hours.

46. A solid catalyst component according to claim 34 or 43 wherein the contact is effected repeatedly.

47. A solid catalyst component for catalysts utilizable for the polymerization of olefins which has been prepared by bringing a co-ground product of a substance (a) obtained by reacting magnesium with at least two molar proportion of an alkyl monohalide in the absence of a solvent but in the presence of iodine and dialkyl phthalate (b) and titanium tetrachloride (c) into contact with titanium tetrachloride in the presence of an aromatic hydrocarbon and/or halohydrocarbon (d) which is liquid at room temperature.

48. A solid catalyst component according to claim 47, wherein the reaction for obtaining the substance (a) is carried out at a temperature above 20° C., preferably above 40° C.

49. A solid catalyst component according to claim 47 or 48, wherein the reaction for obtaining the substance (a) is carried out for a period of time longer than 10 minutes, preferably longer than 30 minutes.

50. A solid catalyst component according to claim 47, wherein the alkyl monohalide is liquid at room temperature and has 3–8 carbon atoms.

51. A solid catalyst component according to claim 50, wherein the alkyl monohalide is n-propyl chloride, isopropyl chloride, n-butyl chloride, isobutyl chloride, pentyl chloride, hexyl chloride or octyl chloride.

52. A solid catalyst component according to claim 47, wherein the iodine is used in an amount of 0.001–1 g per gram of the magnesium.

53. A solid catalyst component according to claim 47, wherein the dialkyl phthalate (b) is dimethyl phthalate, diethyl phthalate, diisopropyl phthalate, dipropyl phthalate, dibutyl phthalate, diisobutyl phthalate, diamyl phthalate, diisoamyl phthalate, ethyl butyl phthalate, ethyl isobutyl phthalate and ethyl propyl phthalate.

54. A solid catalyst component according to claim 47, wherein the proportion of the dialkyl phthalate (b) to the substance (a) is such that the dialkyl phthalate (b) is used in an amount of 0.01–1 g per gram of the substance (a).

55. A solid catalyst component according to claim 47, wherein the proportion of the titanium tetrachloride (c) to be co-ground with the substance (a) and the dialkyl phthalate (b) to the substance (a) is such that the titanium tetrachloride (c) is used in an amount of 0.01–1 g per gram of the substance (a).

56. A solid catalyst component according to claim 47, wherein the titanium tetrachloride is used in an amount of at least 0.1 g, preferably at least 1 g per gram of the co-ground product.

57. A solid catalyst component according to claim 47 or 56, wherein the contact of the co-ground product with the titanium tetrachloride is effected at a temperature from −10° C. to the boiling point of the titanium tetrachloride in the presence of an aromatic hydrocarbon and/or halohydrocarbon which is liquid at room temperature.

58. A solid catalyst component according to claim 47 or 56, wherein the contact is effected for a period from 10 minutes to 100 hours in the presence of the aromatic hydrocarbon and/or halohydrocarbon.

59. A solid catalyst component according to claim 47 or 56, wherein the contact is effected repeatedly, in the presence of the aromatic hydrocarbon and/or halohydrocarbon.

60. A solid catalyst component according to claim 47, wherein the aromatic hydrocarbon and/or aromatic halohydrocarbon is benzene, toluene, xylene, chlorobenzene, bromobenzene, o-dichlorobenzene, o-chlorotoluene or a mixture of these.

61. A solid catalyst component according to claim 32, wherein the contact is effected repeatedly.

62. A solid catalyst component according to claim 44, wherein the contact of the co-ground product with the titanium tetrachloride is effected for a period from 10 minutes to 100 hours.

63. A solid catalyst component according to claim 44, wherein the contact is effected repeatedly.

64. A solid catalyst component according to claim 45, wherein the contact is effected repeatedly.

65. A solid catalyst component according to claim 57, wherein the contact is effected for a period from 10 minutes to 100 hours in the presence of the aromatic hydrocarbon and/or halohydrocarbon.

66. A solid catalyst component according to claim 57, wherein the contact is effected repeatedly, in the presence of the aromatic hydrocarbon and/or halohydrocarbon.

67. A solid catalyst component according to claim 58, wherein the contact is effected repeatedly, in the presence of the aromatic hydrocarbon and/or halohydrocarbon.

* * * * *